(12) United States Patent
Doong et al.

(10) Patent No.: US 6,336,148 B1
(45) Date of Patent: *Jan. 1, 2002

(54) AUTOMATIC CHECKING OF PUBLIC CONTRACTS AND PRIVATE CONSTRAINTS ON DISTRIBUTED OBJECTS

(75) Inventors: Roongko Doong, Palo Alto; Sriram Sankar, Fremont; Mark E. Hefner, Mountain View, all of CA (US)

(73) Assignee: Sun Microsystems, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/719,657

(22) Filed: Sep. 25, 1996

(51) Int. Cl.[7] .................................................. G06F 9/54

(52) U.S. Cl. ........................................ 709/316; 709/330

(58) Field of Search ................................. 395/680, 683; 709/203, 310–332, 101

(56) References Cited

U.S. PATENT DOCUMENTS

| 5,577,251 A | * | 11/1996 | Hamilton | 709/101 |
| 5,640,564 A | * | 6/1997 | Hamilton | 709/315 |
| 5,751,967 A | * | 5/1998 | Raab | 709/228 |
| 5,754,857 A | * | 5/1998 | Gadol | 709/203 |
| 5,787,251 A | * | 7/1998 | Hamilton et al. | 709/203 |
| 6,157,961 A | * | 12/2000 | Kessler et al. | 709/315 |

OTHER PUBLICATIONS

Lortz et al; "Combining contracts and exemplar–based programming for class hiding and customization", ACM digital library, 1994.*

Ravindran et al; "A model of naming for fine–grained service specification in distributed systems", IEEE digital library, 1991.*

David Lamb, "IDL: sharing intermediate representation" ACM digital library, 1987.*

* cited by examiner

*Primary Examiner*—St. John Courtenay, III
(74) *Attorney, Agent, or Firm*—Blakely Sokoloff Taylor & Zafman

(57) ABSTRACT

In a distributed system, a method and apparatus for automatically checking objects according to a specification which includes public contracts and private constraints. Public contracts are obeyed by both client and server, while private constraints are obeyed by either client or server, but for a given private constraint, not by both. At each and every stage of a client-to-server or server-to-client transaction or "call", the objects or parameters related to call are automatically checked to ensure a specification is met. A client-side stub on the client automatically generates and executes checking code to check both private client-side constraints and public contracts on the client prior to network transfer to a server. The server has a server-side skeleton which intercepts the call and objects. The server-side skeleton performs checking by code automatically generated to check the public contracts, if any, with client and any private server-side constraints. Once checking is complete, the call is processed and a server "return" is the result. The return object is then transferred across the network to the client. The client-side stub then performs automatic checking according to the specification of the return object which may be different from the specification checked for objects related to the call initially sent by the client.

26 Claims, 7 Drawing Sheets

AUTOMATIC CHECKING OF PUBLIC CONTRACTS AND PRIVATE CONSTRAINTS ON DISTRIBUTED OBJECTS

BACKGROUND OF THE INVENTION

1. Field of the Invention

The present invention relates to the field of computer systems. More specifically, the present invention relates to the regulation of objects in distributed computer systems.

2. Description of Related Art

In a distributed system such as an automated teller machine (ATM) network, a client such as an individual ATM machine is serviced by a server such as the computer system of the bank whose transaction processing includes interfacing with the ATM machine. The ATM network is a "distributed" system since there can be many clients attached to one or more servers which transact information (objects) amongst one another. Traditionally, distributed objects were forced to obey a common "specification" which are the rules and semantics the objects are governed by. For example, the account balance of a bank patron is an object which is distributed. A rule or specification is that the withdrawal cannot exceed the account balance, and this specification is common to both client and server. A specification common to both client and server ends is referred to as a public contract.

In distributed systems, there are also private constraints which need to be obeyed on only one side, either client or server, but not both. Examples of private constraints include debiting the overall asset column of the bank's balance sheet when a withdrawal is made. The constraint is private to the server since the client is not involved in nor affected by the bank's overall asset accounting. A constraint private to the client is that the amount sought to be withdrawn by the patron must be physically available in the coffers of the ATM machine. The server is not involved in deciding whether or not the currency is available at the ATM machine. Thus, the constraint is private to the client.

To guarantee that a distributed system has good reliability, both private constraints and public contracts must be checked. However, in traditional distributed systems, no attempt was made to automatically check private constraints and in fact, private constraints were not considered as such. Checking, which involves testing to see if the contract or constraint is met, was therefore only performed on public contracts, and not automatically. Even when checked, the problem of latency in server-to-client networking has not been adequately addressed. In the ATM network, when the account balance is passed on to the server, for display to the user, there is latency inherent in communicating the balance. In the meantime, while the balance is being displayed to the user, another debit transaction may be occurring at the server itself which changes the balance. If the balance is not updated to the client until another request or transaction occurs, then the amount is incorrect. Further, while money is being withdrawn on the ATM, due to latency in communicating the transaction back to the server, the server will temporarily have an inaccurate balance.

Thus, there is need to automatically check both private constraints and public contracts to guarantee that objects reliably follow specifications in a distributed system.

SUMMARY

In a distributed system, objects which are transacted between clients and servers must obey certain rules or specification. A specification is composed of two types of rules: public contracts and private constraints.

Public contracts are obeyed by both client and server. Private constraints are obeyed by either client or server, but for a given private constraint, not by both. At each stage of a client-to-server or server-to-client transaction or "call", the objects or parameters related to call are processed before transfer. In a client call, a client-side stub performs marshalling of objects related to the call in order to transfer them over the network. The client-side stub, according to the present invention, automatically generates code to check both private client-side constraints and public contracts between server and client before the transfer occurs. Once the client-side specification is checked, the marshalled objects and client call are transferred over the network to the server.

The server has a server-side skeleton which intercepts the call and marshalled objects. The skeleton unmarshals the objects and performs checking by code automatically generated to check the public contracts, if any, with client and any private server-side constraints. Once checking is complete, the call is processed and a server "return results". The return object is marshalled and checked at the skeleton and then transferred across the network to the client. The client-side stub unmarshals the return object and then performs checking according to its specification which may be different from the specification checked for objects related to the call.

DETAILED DESCRIPTION OF THE INVENTION

Terminology

Figure 1:
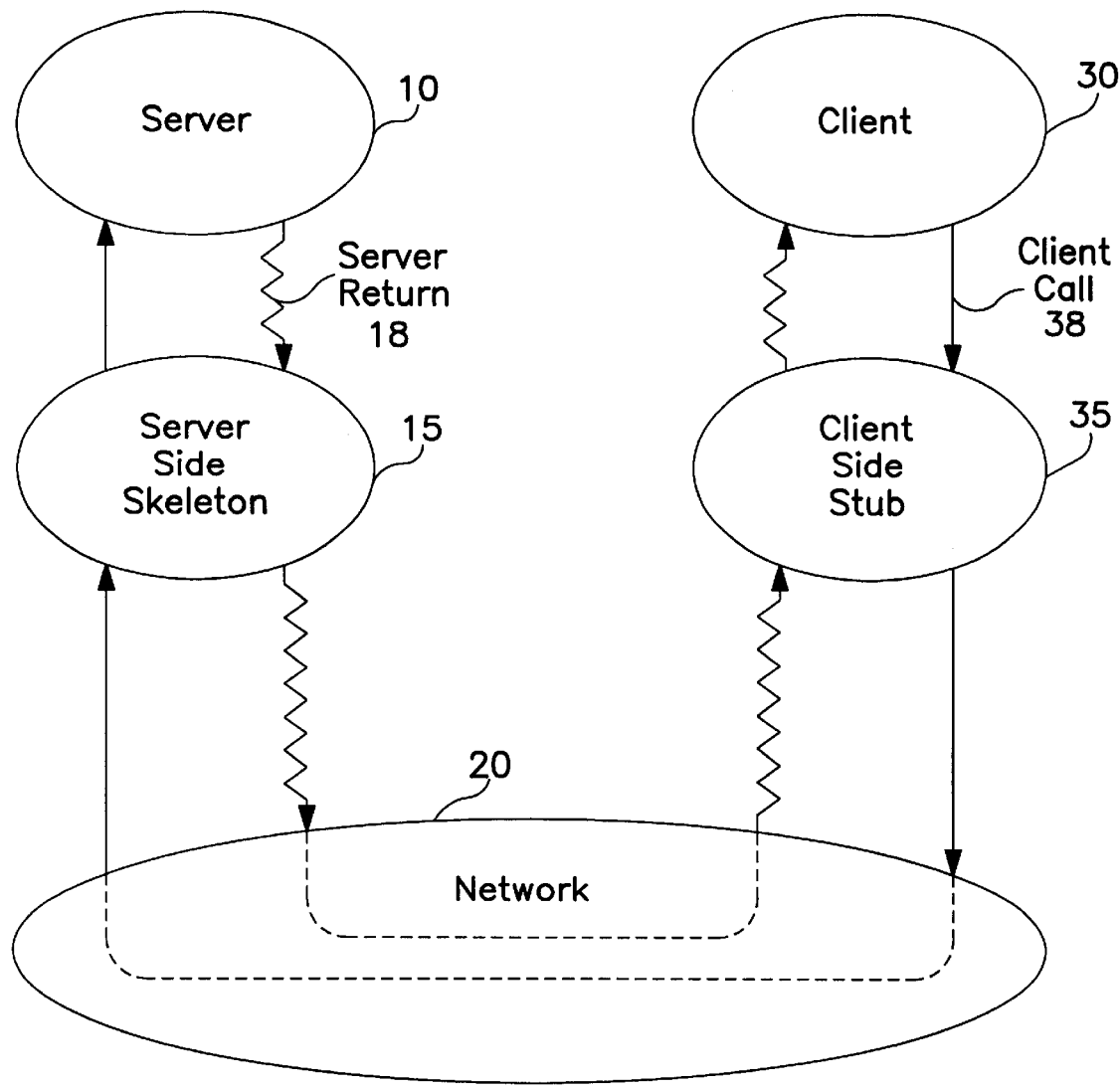
FIG. 1 is a diagram of a distributed system employing no checking.

The following definitions are not intended to be limiting of the scope of this invention in its various embodiments, but are rather, provided to simplify the detailed description set forth herein. Further, since these terms are also known in the art of computer programming, generally, and in object-oriented programming, more specifically, they will not be discussed in-depth.

An "object" refers to a variable, set of variables, an array, record or file or any data structure or class as used in programming a computer system or network of computer systems. More generally, an object is used in representing data in any device capable of receiving, transmitting or processing that data. An object may also refer to a reference to a variable or data structure, such as a memory address or pointer, rather than the variable or data structure itself.

A "client" is a device, computer system or subsystem of a computer system which relies on another device, computer system or subsystem of a computer system for the receiving and processing of certain objects. The device, computer system or subsystem of a computer system which the client relies upon is known as a "server". A "distributed system" is one in which there are one or more clients and servers which communicate objects to complete a task related to those objects. In a distributed system, the clients and servers are usually physically distinct systems or devices which communicate through some network, such as a Local Area Network (LAN) or Wide Area Network (WAN), but may conceptually include only one physical system wherein the clients and servers are portions of that system and communicate, for example, through a bus.

"Marshaling" of an object refers to a way to package together one or more objects for transfer over a network or other communication medium. Marshalled objects are "unmarshalled" or unpackaged into their original form before being utilized on the recipient of the transfer.

A "call" refers to the invocation of a method or procedure, as the term is understood in the art of computer programming, which processes or performs some function or computation utilizing an object or group of objects which it receives, if any. A call may return another object as a result of the completion of the method or procedure which it invokes. Such an object is referred to as a "return."

A "specification" is a rule or set of rules which objects and methods must obey within the distributed system. "Checking" is a means of testing the behavior of calls which utilize objects and/or output return objects by completing those calls in order to ensure that they meet the specification. In an ordinary non-distributed system, a "precondition," one that is tested prior to completion of the method corresponding to the call, is often sufficient to guarantee that the specification is followed. If the pre-condition is tested to be true, then the proper completion of the call/method will, it is assumed, result automatically in a true "postcondition" and consequently, behavior fitting the specification. However, this assumption breaks down in certain cases of distributed systems relying on preconditions and postconditions as described below.

A specification may be either a "public contract" or a "private constraint" or a combination thereof as illustrated in various embodiments of the invention. A public contract is obeyed by both the client and the server, while any one private constraint is specific to either server or client but not to both. Checking can occur, according to various embodiments of the present invention, on both private constraints and public contracts as is required.

FIG. 1 shows the prior art case of a single-client single-server distributed system with no checking of public contracts and private constraints whatsoever. FIG. 1 is provided as background to describe the working of a distributed system in general.

A server 10 has a server-side skeleton 15 to interface with a network 20. Network 20 is coupled to and communicates with the server-side skeleton 15 and also a client-side stub 35. Client-side stub 35 interfaces a client 30. A client call 38 is issued at client 30 which is marshalled by the client-side stub 35 with data and code (collectively, "objects") corresponding to the nature of client call 38. The client call 38 is sent over network 20 and is intercepted by server-side skeleton 15. Server-side skeleton 15 unmarshals the marshalled form of the objects received into a format understood by the server 10. The server 10 processes the client call 38 utilizing the objects and generates a server return 18, which may also be an object. Server return 18 is wrapped (marshalled) by the server-side skeleton 15 and then sent out over network 20. The client-side stub 35 receives and then unmarshals the marshalled form of server return 18 so that the client can understand the results represented by server return 18.

FIG. 1 illustrates a distributed system where checking is not performed on any of the objects. Checking involves ensuring that once the call is completed, the specification is obeyed with respect to return objects resultant from that call. The latency involved during network transfer of both the client call 38 and server return 18 can potentially destabilize the state of objects which, while once following their specification, no longer do so. Further, where more than one client call is invoked on a particular server, a precondition tested as valid for a certain object may become invalid because of another call which changes the state of that object on the server. Thus, while the method of the call is being completed, a valid pre-condition may become invalid, creating an invalid postcondition, and thus a specification which is not obeyed. Thus, even with checking by only verifying that a precondition is true will not, for all calls upon the object, guarantee that a return object and call obeys the specification.

Figure 2:
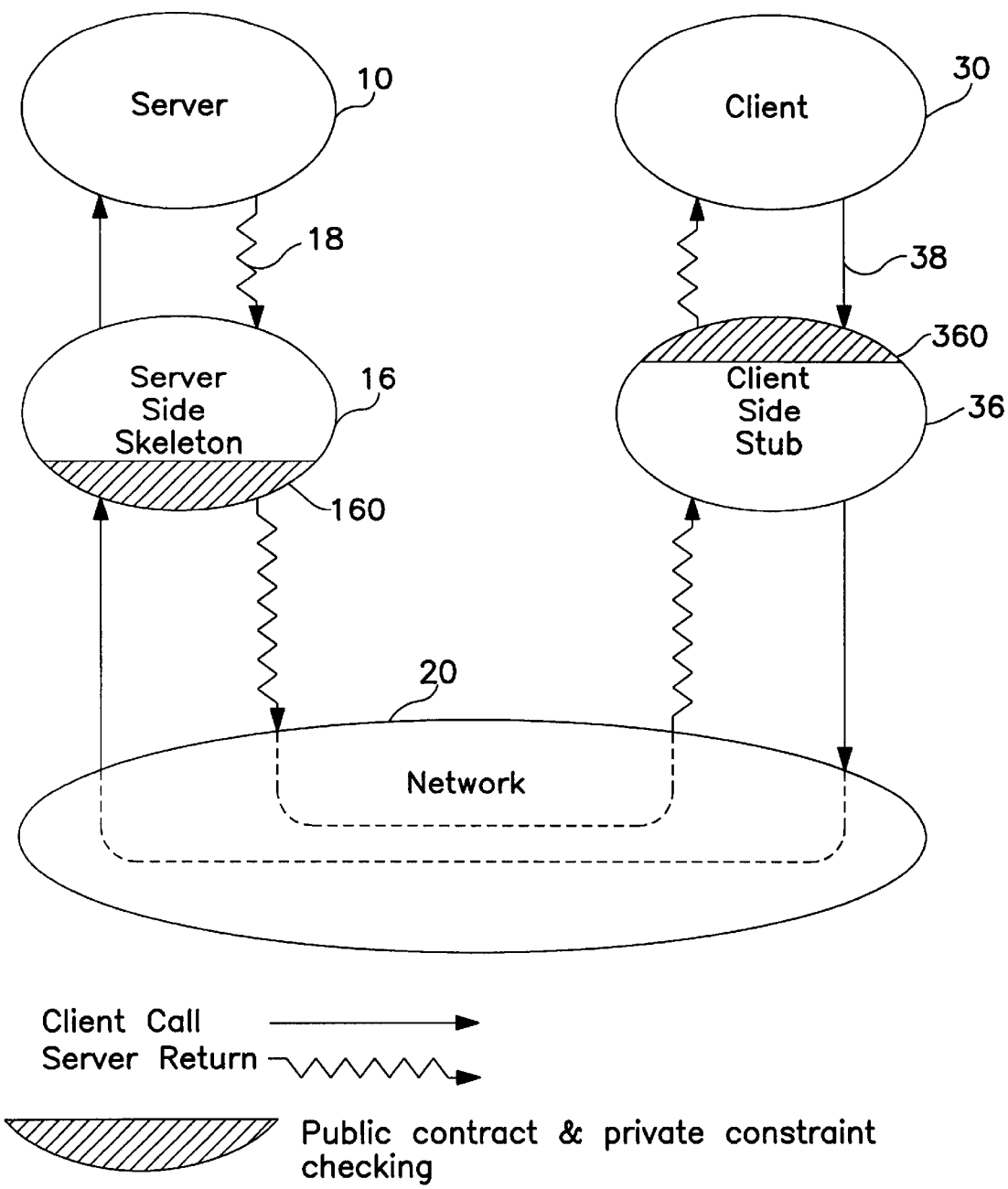
FIG. 2 is a diagram of a distributed system with automatic client and server checking.
Figure 8:
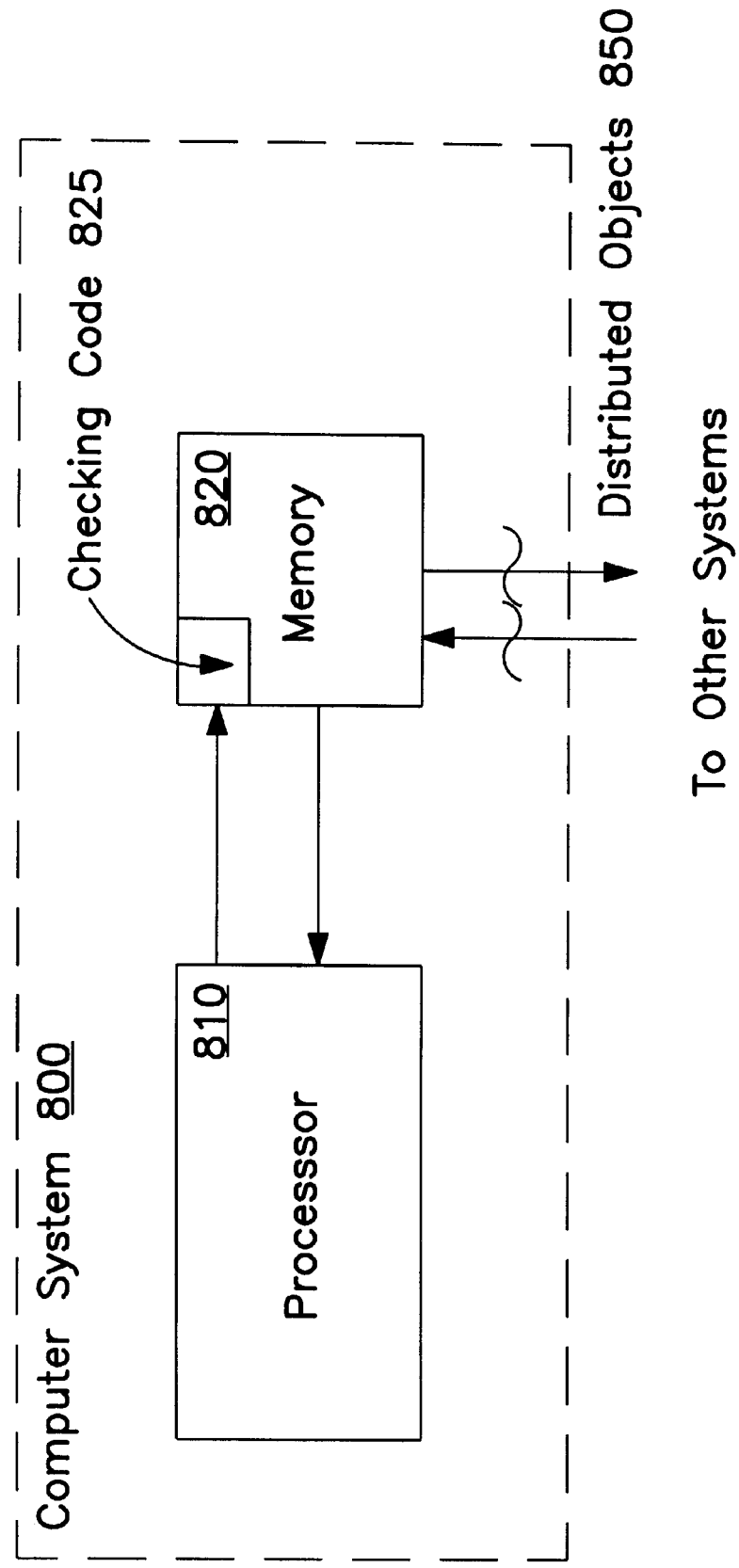
FIG. 8 shows automatic checking as embodied in a computer system.

FIG. 2 shows a single-client single-server distributed system with automatic checking on both client and server in accordance with one embodiment of the invention. All components are similar to those of FIG. 1 except that client-side stub 36 (as opposed to client-side stub 35 of FIG. 1) and server-side skeleton 16 (as opposed to server-side skeleton 15 of FIG. 1) are different. Server-side skeleton 16 and client-side stub 36 have checking portions 160 and 360, respectively, which perform public contract and private constraint checking. The "checking portions" used to describe this and all other embodiments of the invention are programmed/computer generated procedures which are implemented as computer program code and code modules stored in physical memories and storage media and executed through processors which are illustrated in FIG. 8. The code for the checking portions may be implemented in an interface definition language (IDL) which is well known in the art of object oriented programming, or a language which supports IDL extensions such as Borneo(TM) (A product of Sun Microsystems), or in a move commonplace to object-oriented language such as C++.

When a client call 38 is issued from client 30, client call 38 must first pass through the client-side stub 36 which checks that the objects related to the call obey public contracts with the server 10 and private constraints with the client 30 using code automatically generated by client-side stub 36 (checking portion 360). Before client call 38 is marshalled by the stub 36 and is transferred over the network, the code generated for both public contract and private constraint checking is executed to ensure that the client call 38 obeys the specification. The client call 38 is transferred over the network to server-side skeleton 16 which first unmarshals and then checks, using checking portion 160, that the objects resulting from the call obey public contracts and private server-side constraints in the specification. Once the client call 38 (objects of the call) have been checked by the server-side skeleton 16, the server executes the client call 38 which may result in a server return 18. Server return 18 must be marshalled first before it is transferred over the network back to client 30. An example of server return 18 is a balance amount returned to an ATM machine in response to a client call 38 for a balance inquiry. The marshalled form of server return 18 is transferred over the network and is received by client-side stub 36 and its checking portion 360 which checks that the server return 18, once unmarshalled, obeys public contracts and private client-side constraints. Finally, when the last of the checking is completed, the server return 18 can be used by client 30 with a good degree of specification reliability.

For example, client call 38, could be the withdrawal by a bank patron of X dollars in cash from an ATM machine. According to the private constraint and public contract checking, this transaction would operate as follows. At the ATM machine, assume for this transaction that the patron has already inserted his card and received authorization for the withdrawal transaction. The first step is for the ATM machine (client) to inquire of the patron to 1) select which account (savings or checking) and 2) select the amount to be withdrawn. The two selections by the patron are each objects which, if the transaction is to be completed, must be transferred to the bank's database of accounts (server). The "amount" object and the "account type" object are first marshalled (packaged) by the client for secure, reliable transfer over a communications network. Also sent to the server is the client call (the withdrawal service) request itself. The marshalling is performed by a client-side stub (code within the ATM machine) which then executes checking code for public contract and private client-side checking.

In this example, a public contract between server and client which can be checked is whether or not the patron maintains the account type selected or not. A private client-side constraint with which the server is not involved might be sufficient currency resident in the coffers of the ATM machine to carry out the transaction. The public contract checking code would need to access the server and by some indexing method check the patron's account number with the account type which is stored on the server. If the contract is obeyed (condition is true), the transaction can occur, but if not, the transaction cannot occur. The private client-side constraint checking code, in this case, would be a simple comparison between the amount of withdrawal requested and the amount of physical currency available at the machine.

If, and only if, the automatic checking verifies that these parts of the specification, both public and private, are obeyed, will the marshalled objects be passed to the server. Once the package of objects arrive at the server, they are unmarshalled into their original forms of an "account type" object and "amount" object by the skeleton on the server. The receipt of the call along with the unmarshalling of objects automatically triggers execution of public contract and private server-side constraint checking code. The public contract specifying that the account type chosen by the patron must be available is checked again. In traditional distributed systems, this checking of the public contract a second time is not performed and therefore, a time lag or latency may create a situation where an account that was available at the time of checking the public contract on the client is now closed. By automatically checking the public contract again, this embodiment of the invention guarantees that the specification is more closely obeyed and cannot be corrupted by network latency. The server-side checking code includes the public contract of verifying that the account is available and also includes a private server-side constraint which requires that the account balance of the patron is sufficient to permit the withdrawal. Thus, if the account balance is less than the amount of withdrawal, an error message can be returned to the client. This constraint is private and not public because the bank may not wish that the account balance be passed over the network to the client. The client is not involved per se with the verification of funds in the patron's account—that task belongs to the bank and consequently, the server.

If the public contract and private constraint is checked, as obeying the specification, the call for withdrawal will result in the server producing a return "authorization" object, such as a boolean value, indicating that the funds be paid out. Simultaneously, the subtraction of the amount of the withdrawal from the account balance on the server is also ensured.

The return "authorization" object must also pass through the client-side stub again, but in this instance no checking is performed or initiated since the stub has no checking to perform on return "authorization" objects. The amount of currency, in this example, will not have changed from the time the client call for withdrawal was initiated because an ATM can usually only process one transaction at one time. However, a coffer that is shared by more than one ATM machine may necessitate re-checking on the client-side for the private client-side constraint requiring that the amount requested be available in physical currency. In this case, the ATM machine can be programmed to check the private constraint even upon a return "authorization" object from the server. However, depending on the specification desired, public contract checking can be excluded for the return "authorization" object.

ATM machines do not perform specification-based checking currently. Although they behave according to specification, the checking is internal to (built into) the procedure of withdrawal rather than external and automatic.

Figure 3:
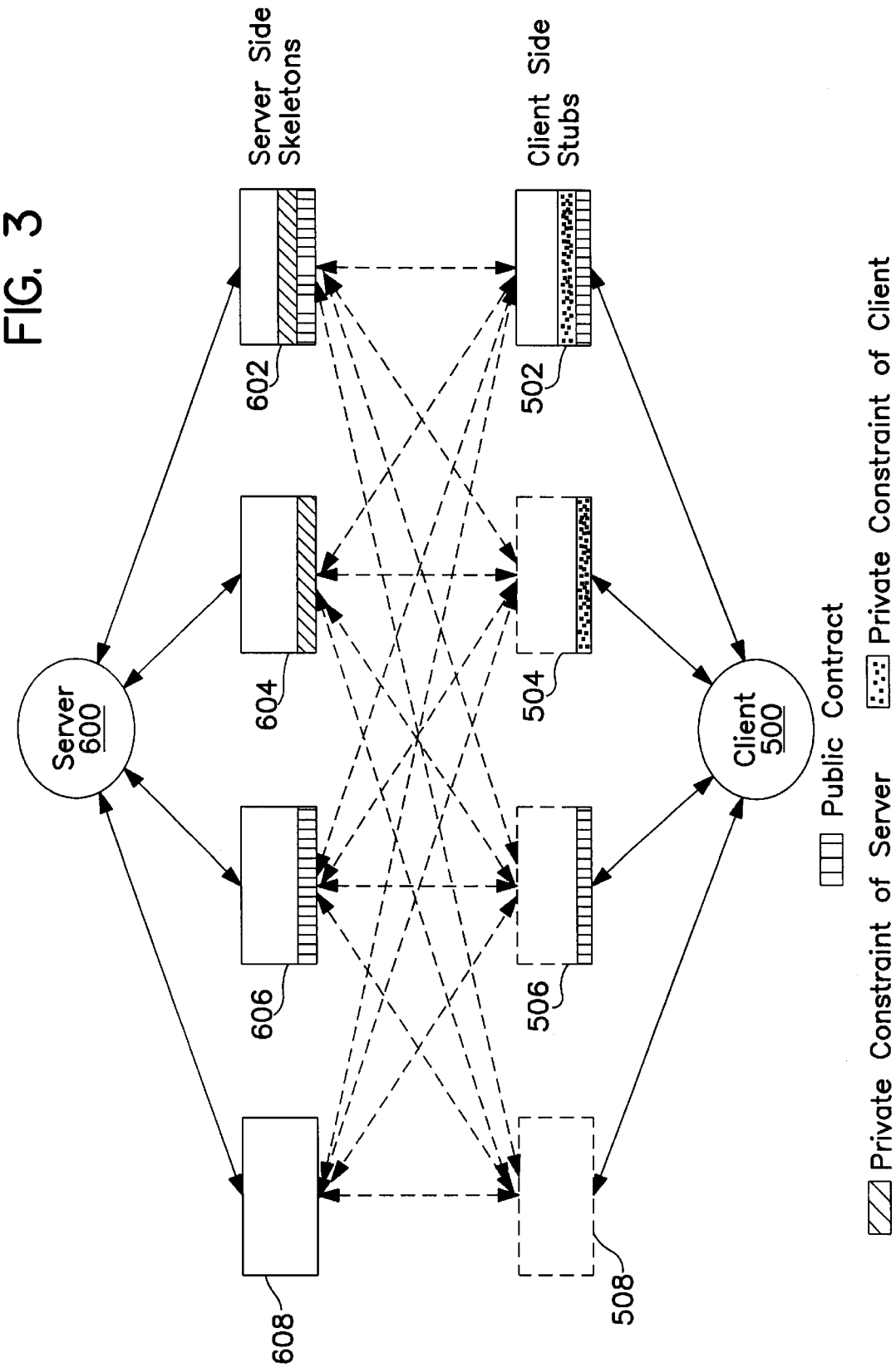
FIG. 3 is a diagram showing all permutations of public contracts and private constraints between a server and client.

FIG. 3 is a diagram showing all the possible combinations of public contracts and private constraints constituting specifications that can be checked automatically. Shown are four (4) different server-side skeleton possibilities and four (4) different client-side stub possibilities for public contracts and private constraints.

On the client-side, four client-side stubs, 502, 504, 506 and 508, are all shown coupled to client 500. Client-side stubs are coupled to client 500 in that the stubs may be programs or code modules implemented or contained in either hardware or software in client 500. Client-side stubs act as intermediaries between the client and server 600 isolating the client from direct object/call interaction with the server. The legend at the bottom of FIG. 3 shows that client-side stub 502 checks both a private constraint of the client as well as a public contract. Client-side stubs 504, 506 and 508 are also coupled to client 500 to isolate it from server 600. Another combination is shown in client-side stub 504 which only checks a private constraint of client. In client-side stub 506 only a public contract is checked, and no private constraint is checked.

Client-side stub 508 performs no public contract nor private constraint checking at all and represents the case where, even though checking is available, it is not desired because the object/call has no crucial specification to obey. In the ATM example, the client call for the patron selecting "English" or "Spanish" as the transaction language might not require any checking at all. The state of objects on and calls to server 600 are unaffected by the selection of language and therefore no public contract is required. Further, the call regarding language, while selecting one set of display menus (either English or Spanish depending on the user's choice) over another, has no effect on any of the critical calls or objects (such as passwords, account information, etc.) of client 500 and therefore, private constraints on the client are unnecessary.

On the server-side, four server-side skeletons, 602, 604, 606 and 608, are all shown coupled to server 600. Server-side skeletons are coupled to server 600 in that the skeletons may be a program or code implemented or contained in either hardware or software on the server 600. Server-side skeletons act as intermediaries between server 600 and client 500 isolating the server from direct object/call interaction with the client. The legend at the bottom of FIG. 3 shows that server-side skeleton 602 checks both a private constraint of the server as well as checking a public contract. Server-side skeletons 604, 606 and 608 are also coupled to server 500 to isolate it from client 500. Another combination is illustrated by server-side skeleton 604 which only checks a private constraint of server. In server-side skeleton 606 only a public contract is checked, and no private constraint is checked.

Server-side skeleton 608 performs no public contract nor private constraint checking at all and represents the case where, although checking is available, it is not desired because the object/call has no crucial specification nor is a vital object/call. This occurs only when the object/call to the server is not crucial from the server's point of view. The dotted arrows illustrate that any type of client-side stub may be matched with any type of server-side skeleton, bringing the possible combinations of stubs and skeletons to 16. Thus a server skeleton such as server skeleton 602 with both public contract and private server-side constraint checking may be paired with client-side stub 502 which checks both public contracts and private constraints.

Figure 4:
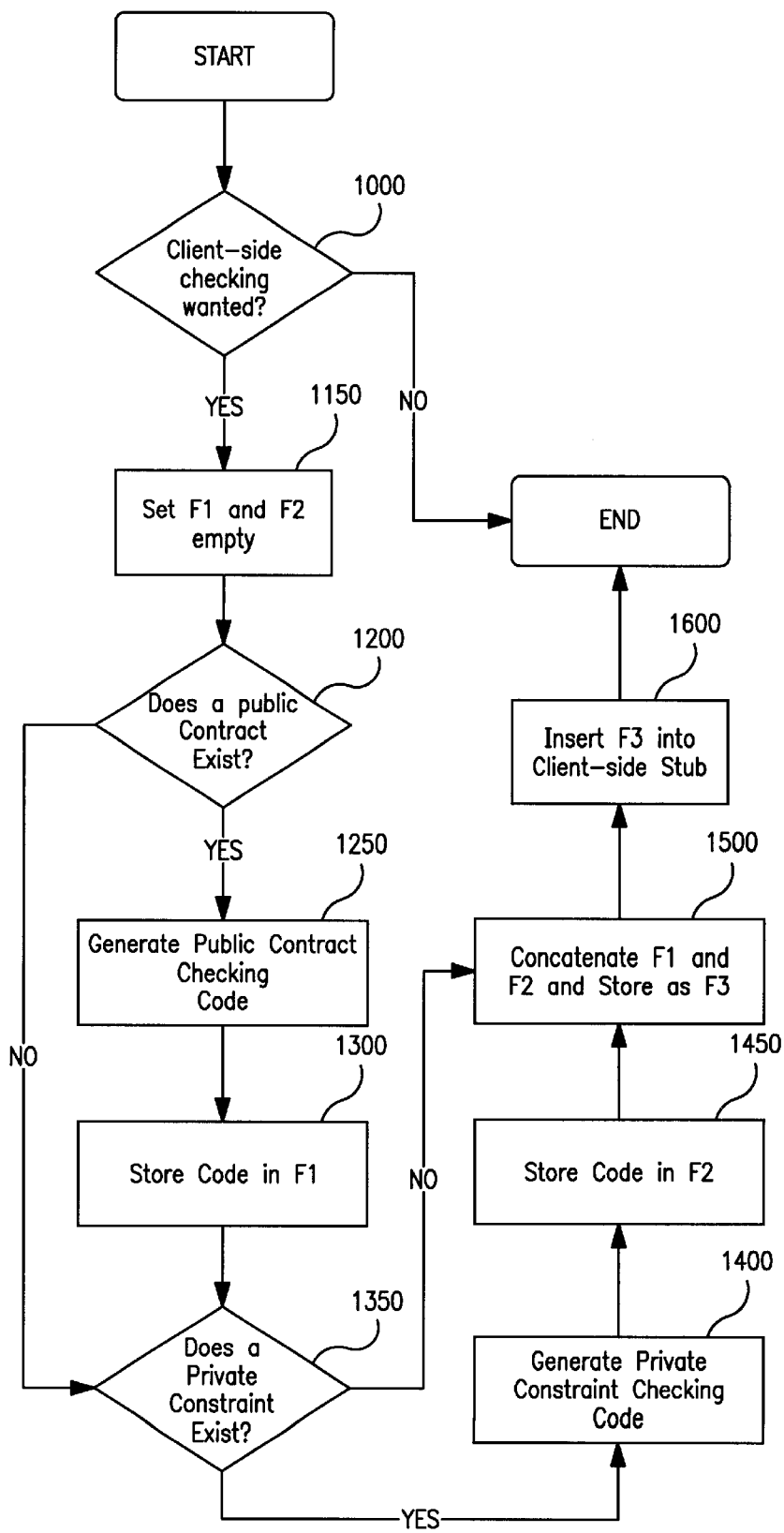
FIG. 4 is a flowchart of client-side checking code generation.

FIG. 4 is a flowchart of client-side checking code generation. IDL, or Interface Definition Language, describes the signature of a function (name of a function, the type of object it returns, and the type of parameters it takes as input/output). A stub (for client) and a skeleton (for server) are generated according to the signature. Any call to the function has to first call and pass through the stub, and in turn the stub calls the underlying network, with the network then calling the server through the skeleton. A tool known as Borneo (a product of Sun Microsystems), extends IDL with specification capability so that the user can specify public contracts and private constraints for both server and client calls/objects. The public contracts and the private constraints checking results are essentially just boolean expressions. A public contract or a private constraint is violated if the boolean expression is evaluated to false. Checking code capable of evaluating the boolean expressions is then generated and inserted into the stub/skeleton. The new stub/skeleton has to be compiled and replaced with the old stub/skeleton for the checking to take effect.

Referring to FIG. 4, the code is automatically generated for the object/call involved as long as checking is found to be wanted according to step 1000. At step 1150, F1 and F2, which represent public contract code space and private client-side constraint code space, respectively, are set empty or cleared. F1 and F2 may be an area of memory of a computer system or the code space of an application/software running on a computer, or even buffers and other storage devices such as hard disks. F1 and F2 are cleared in step 1150 to prevent contamination from previous public contract and private client-side constraints which may be stale or inapplicable to the current object/call for which checking is deemed desired. At step 1200, the existence of a public contract is tested. If, at step 1200, no public contract is found, then the algorithm skips to check for the existence of a private constraint at step 1300. If a public contract is found, then according to step 1250, the code used for that public contract is generated and/or compiled. Once the public contract code is generated, then at step 1300, the public contract code is saved in F1 which is the code space reserved for public contracts.

At step 1350, the existence of private constraints is tested. If, at step 1350, no private constraint is found, then the checking procedure skips to step 1500. However, if a private client-side constraint is found, then according to step 1400, the code used for that private constraint is generated and/or compiled. Once the private constraint code is generated, then at step 1450, the private constraint code is saved in F2 which is the code space reserved for private constraints.

At step 1500, once all potential code spaces for public contracts and private client-side constraints are generated/compiled and stored, F1 and F2 are concatenated together and saved in a combined code space F3, which may be similar to F1 and F2 in implementation but is of a size capable of containing both F1 and F2. If either F1 or F2 is null because the checking associated with them was not required, and thus no code was generated or saved for it, then F3 is simply the result of the non-empty code space concatenated with a null code space which yields the non-empty code space. Once all code (F1 and F2) is saved in F3, then, according to step 1600, F3 is inserted into the client-side stub which is the wrapper for all objects/calls that pass to and from the client. F3 is then the checking through which the objects/calls must now pass.

Figure 5:
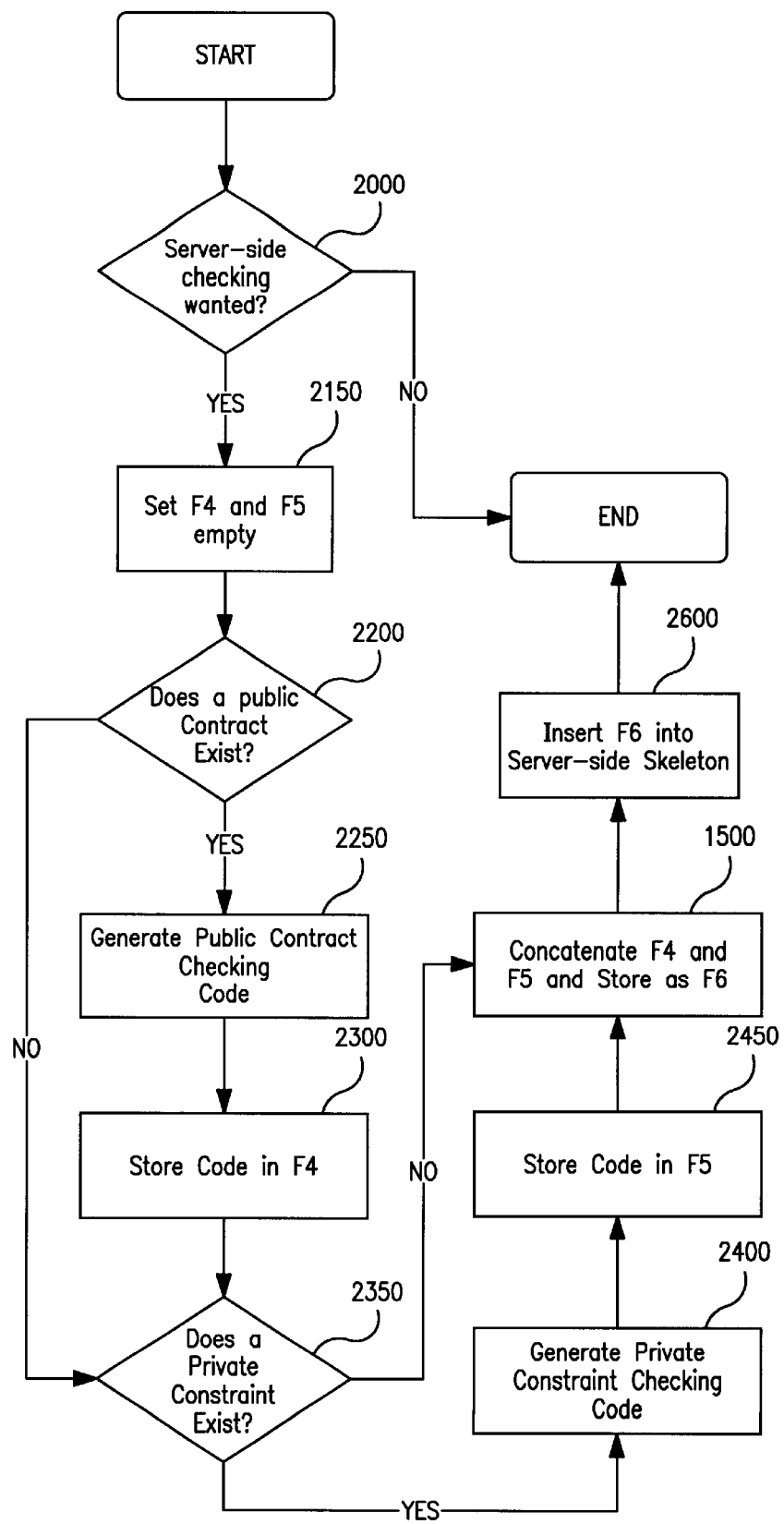
FIG. 5 is a flowchart of server-side code checking generation.

FIG. 5 is a flowchart of server-side checking code generation. The code is automatically generated for the object/call involved as long as checking is detected as wanted according to step 2000. At step 2150, F4 and F5, which represent public contract code space and private server-side constraint code space, respectively, are set empty or cleared. F4 and F5 are an area of memory of a computer system or the code space of an application/software running on a computer, or even buffers and other storage devices such as hard disks. F4 and F5 are cleared in step 2150 to avoid contamination from previous public contract and private server-side constraints which may be stale or inapplicable to the current object/call for which checking is deemed desired. At step 2200, the existence of a public contract is tested. If, at step 2200, no public contract is found, then the algorithm skips to check for the existence of a private constraint at step 2300. If a public contract is found, then according to step 2250, the code used for that public contract is generated and/or compiled. Once the public contract code is generated, then at step 2300, the public contract code is saved in F4 which is the code space reserved for public contracts.

At step 2350, the existence of private constraints is tested. If, at step 2350, no private constraint is found, then the checking procedure skips to step 2500. However, if a private server-side constraint is found, then, according to step 2400, the code used for that private constraint is generated and/or compiled. Once the private constraint code is generated, then at step 2450, the private constraint code is saved in F5 which is the code space reserved for private constraints.

At step 2500, once all potential code modules for public contracts and private server-side constraints are generated and stored, F4 and F5 are concatenated together and saved in a combined code space F6, which may be similar to F4 and F5 in design but is much larger in size and capable of containing both F4 and F5. If either F4 or F5 is null because the checking associated with them was not found, and thus no code was generated or saved for it, then F6 is simply the result of the non-empty code space concatenated with a null code space which yields the non-empty code space. Once all code (F4 and F5) is saved in F6, then, according to step 2600, F6 is inserted into the server-side stub which is the wrapper for all objects/calls that pass to and from the server. F6 is then the checking through which the objects/calls must now pass.

Figure 6:
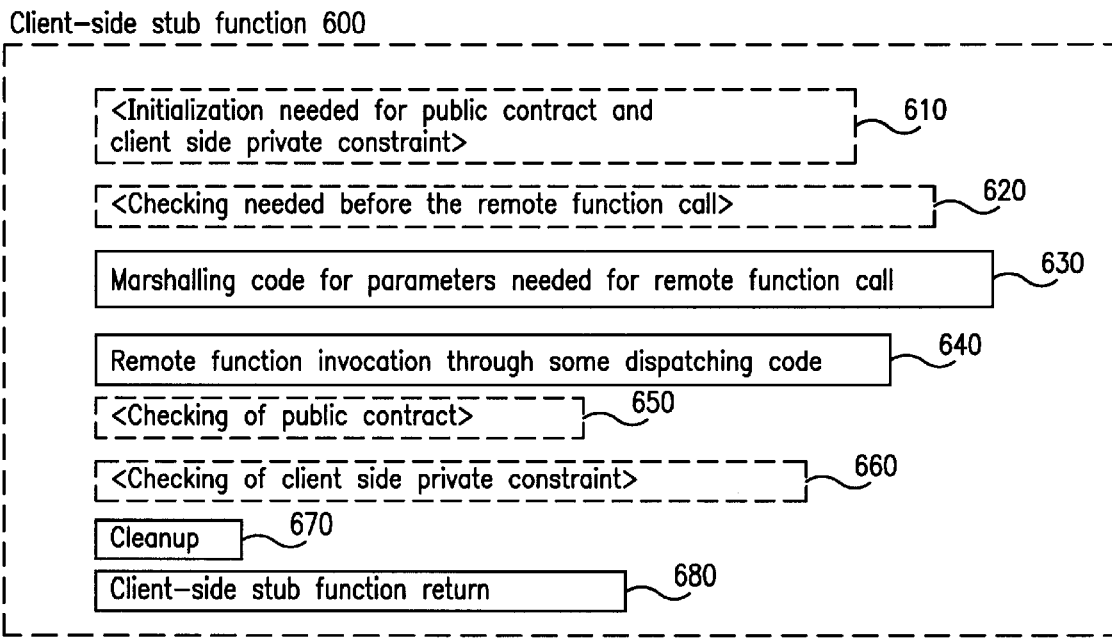
FIG. 6 is pseudo-code for a client-side stub function.

FIG. 6 shows the pseudo-code of a typical client-side stub function. Logically, the first operation is initialization needed for the public contract and private constraint, labeled as 610. Client-side stub function 6000 is the modified version of the stub function as generated by a typical distributed system and is employed for checking of public contracts and private constraints. Code portions labeled 610, 620, 650, and 660 are the calls, commands and functions used for automatic checking. Code portion 610 is the code for any necessary initialization of the checking code, such as allocation of memory or copying of input parameters. Code portion 620 checks client-side preconditions (both public and private) and saves some values (e.g., current account balance before a withdrawal) that are needed for automatic checking in code portions 650 and 660. Code portion 630 performs marshalling of objects destined for the server function call and thereby, prepares the parameter data for transportation across the network. Code portion 640 calls the server through the network by invoking a function remote to the client through some dispatching code and waits for a return or reply. Code portion 650 performs checking of the public contract. Code portion 660 performs checking of the private constraint. Code portion 670 is the code for memory deallocation and other typical cleanup such as garbage collection on the client. Code portion 680 marks the end of the stub function and is signified by a server return object being received at the client.

Figure 7:
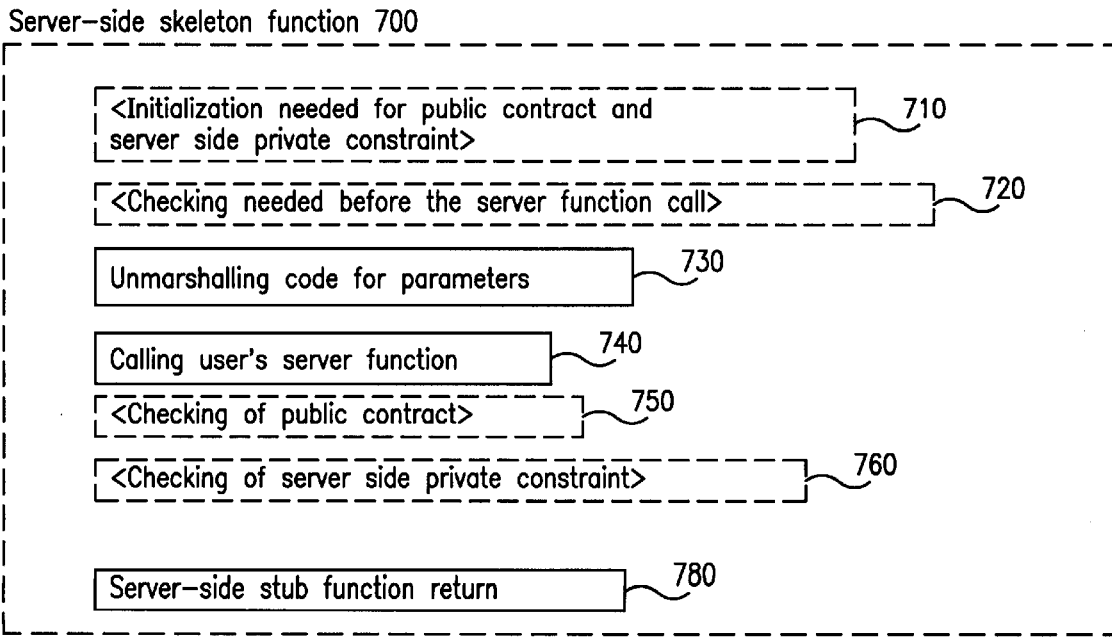
FIG. 7 is pseudo-code for a server-side skeleton function.

FIG. 7 shows the pseudo-code of a server-side skeleton function. Again, as in FIG. 6, the first step is code portion 710 which does initializing necessary for checking by server-side skeleton function 700 such as the allocating of memory and passing of input parameters. Server-side skeleton 700 is a modified version of the skeleton function of a typical distributed system and is employed for server-side public contract and private constraint checking. Code portion 720 performs checking of preconditions (both public and private) and saves some values (e.g., saving the balance before withdrawal) that will be used in automatic checking. Code portion 730 performs unmarshalling of data for the server call such that the data is transformed into parameter form usable by code executed on the server. Code portion 740 calls a server function which may have originated in a client. Code portions 750 and 760 perform the public contract and private constraint checking. once all checking is concluded, the server issues or sends a "return" or reply which results from the execution of the server call.

A well-known object-oriented programming methodology is that of inheritance. For a function F of class B that inherits from class A, function F of class B has to obey not only the public contracts and private constraints specified in class B, but function F of class B also has to obey the public contracts of function F in class A. However, the function F of class B does not need to satisfy the private constraint of the function F of class A. Public contract and private constraint checking can likewise be extended to any number of programming methods whether object-oriented or not.

FIG. 8 shows automatic checking as implemented in a computer system. A computer system 800 may be any electronic or other device capable of processing data and producing output, such as a personal computer. While computer system 800 may have a number of input/output devices, such as a modem, for performing input/output (I/O) operations, only a processor and memory are shown in FIG. 8 so as not to obscure the invention.

Computer system 800 includes a processor 810 which can be a central processing unit (CPU) or other processor logic circuit for executing program code, and a memory 820 for storing that code and configuring it for use in the processor. Memory 820 may be Random Access Memory (RAM), or any writeable storage unit or memory device such as a disk drive.

Computer system 800, according to the present invention, may be part of a client-side stub or server-side skeleton or, alternatively, the stub/skeleton may be a part of the computer system 800. When distributed objects 850 are received by the computer system 800, the objects 850 (which may also include "calls" or requests) are stored in memory 825 and trigger the processor to automatically generate code for checking the specification of those objects. Processor 810 first determines whether private constraints are required to be checked. If so, processor 810 generates, according to a set of predetermined process commands specified in other program code, private constraint checking code. Likewise, for public contracts that are required, processor 810 generates public contract checking code. Both public contract and private constraint code which are generated are stored (concatenated) together in a contiguous memory space so as to be executed conjunctively.

Once checking code 825 is generated, processor 810 automatically passes distributed objects 850 to the checking code 825 and executes the checking code 825 which ensures that the specification is obeyed. If the computer system 800 is requested to issue a "reply" or further process distributed objects 850 into a different form (generate a return object), processor 810 in conjunction with memory 820 can be configured to handle such requests.

Many alternate embodiments of the present invention are possible, depending upon the needs and requirements of the distributed system, and the embodiments described above are merely exemplary.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A computer implemented method for automatically checking a specification for objects in a distributed system having a client, said method comprising:

splitting said specification into private client-side constraints and public contracts;

inserting code to check said specification into a client-side stub, said code being implemented in an interface definition language (IDL) or a language which supports IDL extensions; and executing said code to ensure that said specification is obeyed.

2. The method of claim 1, wherein each of said objects exhibits a type and said specification varies according to the type exhibited by said objects and according to a client call generated from said client.

3. The method of claim 1, wherein said inserting code includes:

generating public contracts code using said client-side stub;

generating private client-side constraint code using said client-side stub; and concatenating said public contract code and private client-side constraint code to produce said code for checking said specification.

4. The method of claim 1, wherein said executing said code to ensure that said specification is obeyed includes passing said objects through said client-side stub before any transfer to said distributed system.

5. A computer implemented method for automatically checking a specification for objects in a distributed system, said method comprising the steps of:

splitting said specification into private server-side constraints and public contracts;

inserting code to check said specification into a server-side skeleton, said code being implemented in an interface definition language (IDL) or a language which supports IDL extensions; and executing said code to ensure that said specification is obeyed.

6. The method of claim 5, wherein each of said objects exhibits a type and said specification varies according to the type exhibited by said objects and according to a server return generated from said server.

7. The method of claim 5, wherein said inserting code includes:

generating public contract code using said server-side skeleton;

generating private client-side constraint code using said server-side skeleton; and concatenating said public contract code and private client-side constraint code to produce said code for checking said specification.

8. The method of claim 5, wherein executing said code to ensure that said specification is obeyed includes passing said objects through said server-side skeleton before any transfer to said distributed system.

9. A computer implemented method for transacting a call on a distributed system having a client and server, said call having objects related to it, said method comprising:

checking public contracts between said server and said client on said server using a first checking code, said first checking code being implemented in an interface definition language (IDL) or a language which supports IDL extensions;

checking private server-side constraints on said server using said first checking code;

checking public contracts on said client using a second checking code, said second checking code being implemented in an interface definition language (IDL) or a language which supports IDL extensions; and checking private client-side constraints on said client using said second checking code wherein said transacting is successful only if all checking of constraints and contracts ensures that a specification of said call is obeyed.

10. The method of claim 9, wherein checking public contracts and private server-side constraints on said server is automatically performed by a server-side skeleton for any of said objects and for said call transferred to and from said server.

11. The method of claim 9, wherein checking public contracts and private client-side constraints on said server is automatically performed by a client-side stub for any of said objects and for said call transferred to and from said client.

12. A computer implemented method for transacting a call on a distributed system having a client and server, said call having objects related to it; said method comprising:

checking public contracts and private client-side constraints on said client using a first checking code, said first checking code being implemented in an interface definition language (IDL) or a language which supports IDL extensions;

marshalling said objects at said client;

umarshalling said objects at said server;

checking private server-side constraints and public contracts on said server using a second checking code, said second checking code being implemented in an interface definition language (IDL) or a language which supports IDL extensions; and processing said call on said server to yield a return object passed to said client.

13. A distributed system comprising:

a network;

a client;

a client-side stub coupled to the network and to said client, the client-side stub including a first checking code to automatically check distributed objects transferred to and from the client;

a server;

a server-side skeleton coupled to the network and to the server, the server-side stub including a second checking code to automatically check distributed objects transferred to and from the server.

14. The distributed system of claim 13, wherein the first checking code, when executed by a processor of said client, checks public contracts with said server and private client-side constraints according to said specification.

15. The distributed system of claim 13, wherein the second checking code, when executed by a processor of said client, checks public contracts with said client and private server-side constraints according to said specification.

16. A computer implemented method for automatically checking a specification of objects in a distributed system, having at least one client, said method comprising:

generating a first public contract checking code in said client to check one or more public contracts with the server;

generating private client-side constraint checking code in said client to check one or more private client-side constraints;

concatenating said first public contract checking code with said private client-side constraint checking code to to form a first checking code to include in a client-side stub;

generating a second public contract checking code in said server to check one or more public contracts with the client;

generating a private server-side constraint checking code in said serve to check one or more private server-side constraints;

concatenating said second public contract checking code with said private server-side constraint checking code to form a second checking code to include in a server-side skeleton; and during calls between the client and the server, passing said objects through the server-side skeleton and the client-side stub to automatically check said objects' compliance with the one or more private server-side constraints, the one or more public contracts with the client, the one or more private client-side constraints, and the one or more public contracts with the server.

17. A computer system for checking the specification of distributed objects comprising:

a processor;

a memory coupled to said processor;

said memory being configured to cause said processor to automatically generate checking code executed by said processor, said checking code being implemented in an interface definition language (IDL) or a language which supports IDL extensions, said checking code when executed by said processor ensuring that said specification is obeyed for said distributed objects and comprising:
- a public contract checking code portion configured to check that said objects obey a specification common to client and server; and
- a private constraint checking code portion configured to check that said objects obey a specification private to one of said client and server, but not both.

18. A system for automatic checking of distributed objects between a client and a server, including code storable on a computer-readable apparatus and executable by computer, said code being implemented in a interface definition language (IDL) or a language which supports IDL extensions, said code including code portions, said system comprising:
- a public contract checking code portion configured to check that said objects obey a specification common to client and server; and
- a private constraint checking code portion configured to check that said objects obey a specification private to one of said client and server, but not both.

19. The system of claim 18, wherein said client and said server are connected over a network.

20. A method of verifying compliance with object specifications comprising:
- a client initiating a transaction with a server via a client-side stub, the transaction involving a distributed object having a specification defining a set of rules and/or semantics by which the distributed object is governed including a set of private client-side constraints, a set of private server-side constraints, a set of public contracts with the server, and a set of public contracts with the client;
- prior to marshalling the distributed object for transfer to the server via a server-side skeleton, the client-side stub verifying the distributed object's compliance with the specification by evaluating the set of private client-side constraints and the set of public contracts with the server;
- if the distributed object is deemed compliant with the specification by the client-side stub, the client-side stub marshalling the distributed object and transferring the marshalled distributed object over a network to the server-side skeleton;
- the server-side skeleton unmarshalling the marshalled distributed object and verifying compliance with the specification by evaluating the set of private server-side constraints and the set of public contracts with the client; and
- if the distributed object is deemed compliant with the specification by the server-side skeleton, the server-side skeleton providing the distributed object to the server to allow the server to process the transaction.

21. The method of claim 20, wherein said evaluating the set of private client-side constraints and the set of public contracts with the server includes executing client-side checking code that has automatically been generated and associated with the client-side stub.

22. The method of claim 20, wherein said evaluating the set of private server-side constraints and the set of public contracts with the client includes executing server-side checking code that has automatically been generated and associated with the server-side skeleton.

23. The method of claim 20, further comprising:
- the server executing the transaction and generating a server return having second specification defining a set of rules and/or semantics by which the server return is governed including a second set of private client-side constraints, a second set of private server-side constraints, a second set of public contracts with the server, and a second set of public contracts with the client;
- prior to marshalling the server return for transfer to the client via the client-side stub, the server-side skeleton verifying the server return's compliance with the second specification by evaluating the second set of private server-side constraints and the second set of public contracts with the client;
- if the server return is deemed compliant with the second specification by the server-side skeleton, the server-side skeleton marshalling the server return and transferring the marshaled server return over the network to the client-side stub.

24. The method of claim 23, further comprising:
- the client-side stub unmarshalling the marshalled server return and verifying compliance with the second specification by evaluating the second set of private client-side constraints and the second set of public contracts with the server; and
- if the server return is deemed compliant with the second specification by the client-side stub, the client-side stub providing the server return to the client.

25. The method of claim 21, wherein the client-side checking code is implemented in an interface definition language (IDL) or a language that supports IDL extensions.

26. The method of claim 22, wherein the server-side checking code is implemented in an interface definition language (IDL) or a language that supports IDL extensions.

* * * * *